(12) United States Patent
Lin

(10) Patent No.: US 6,615,326 B1
(45) Date of Patent: Sep. 2, 2003

(54) METHODS AND STRUCTURE FOR SEQUENCING OF ACTIVATION COMMANDS IN A HIGH-PERFORMANCE DDR SDRAM MEMORY CONTROLLER

(75) Inventor: Shuaibin Lin, Boulder, CO (US)

(73) Assignee: LSI Logic Corporation, Milpitas, CA (US)

( * ) Notice: Subject to any disclaimer, the term of this patent is extended or adjusted under 35 U.S.C. 154(b) by 77 days.

(21) Appl. No.: 09/991,238

(22) Filed: Nov. 9, 2001

(51) Int. Cl.[7] .............................................. G06F 13/00
(52) U.S. Cl. ........................ 711/154; 711/168; 711/169
(58) Field of Search ................................. 711/154, 168, 711/169

(56) References Cited

U.S. PATENT DOCUMENTS

| | | | | |
|---|---|---|---|---|
| 6,145,073 A | * | 11/2000 | Cismas ......................... 712/25 |
| 6,233,199 B1 | * | 5/2001 | Ryan ............................ 365/233 |
| 6,452,867 B1 | * | 9/2002 | Ryan ............................ 365/233 |
| 2003/0033493 A1 | * | 2/2003 | Cismas ........................ 711/158 |

* cited by examiner

*Primary Examiner*—Reba I. Elmore
(74) *Attorney, Agent, or Firm*—Lathrop & Gage

(57) ABSTRACT

Methods and structure in a memory controller for sequencing memory device page activation commands to improve memory bandwidth utilization. In a synchronous memory device such as SDRAM or DDR SDRAM, an "activate" command precedes a corresponding "read" or "write" command to ensure that the page or row to be accessed by the "read" or "write" is available ("open") for access. Latency periods between the activation of the page and the readiness of the page for the corresponding read or write command are heretofore filled with nop commands. The present invention looks ahead for subsequent read and write commands and inserts activation commands (hidden activates) in nop command periods of the SDRAM device to prepare a page in another bank for a read or write operation to follow. This sequencing of activate commands overlaps the required latency with current read or write burst operations.

12 Claims, 11 Drawing Sheets

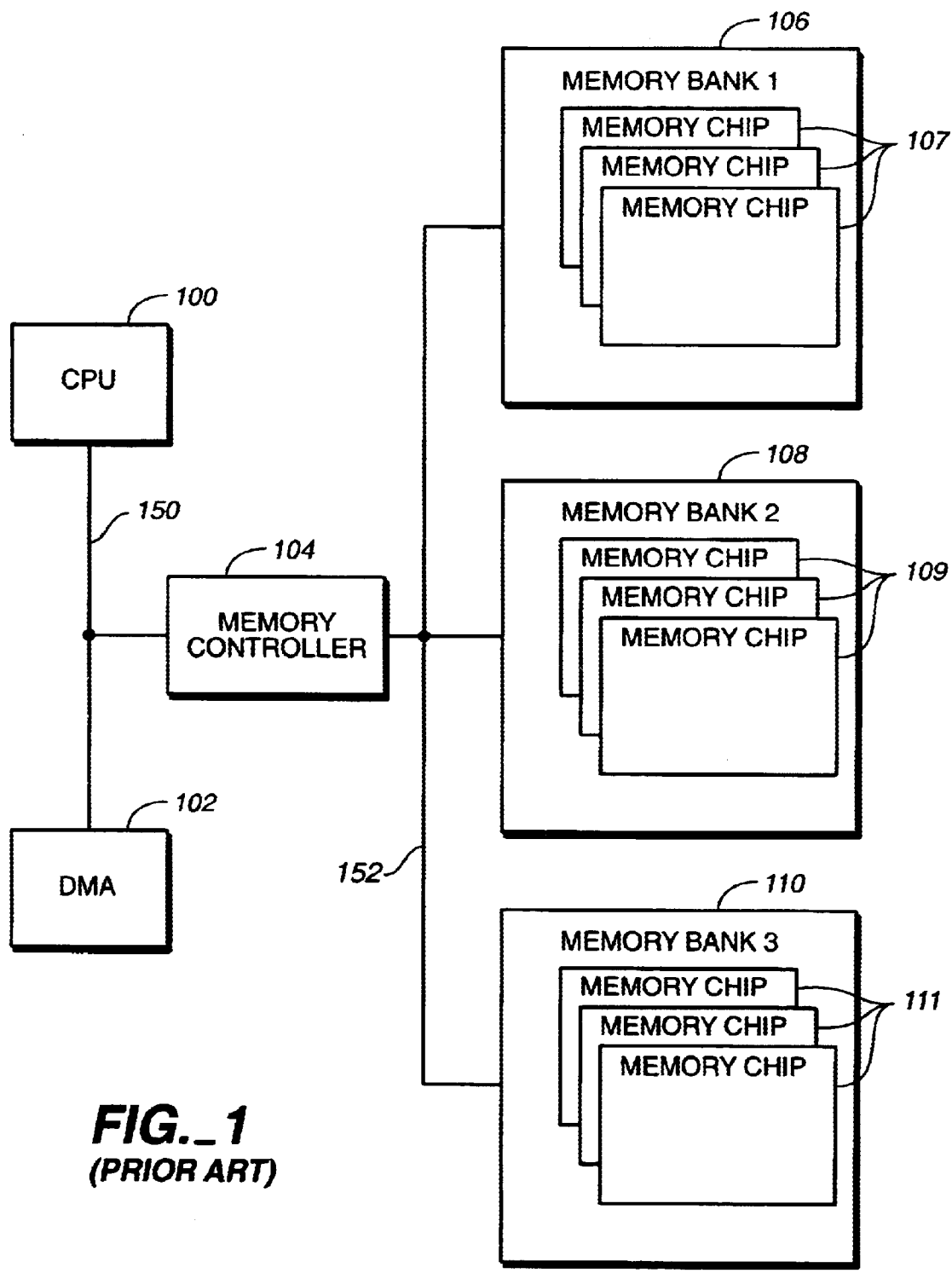
FIG._1
*(PRIOR ART)*

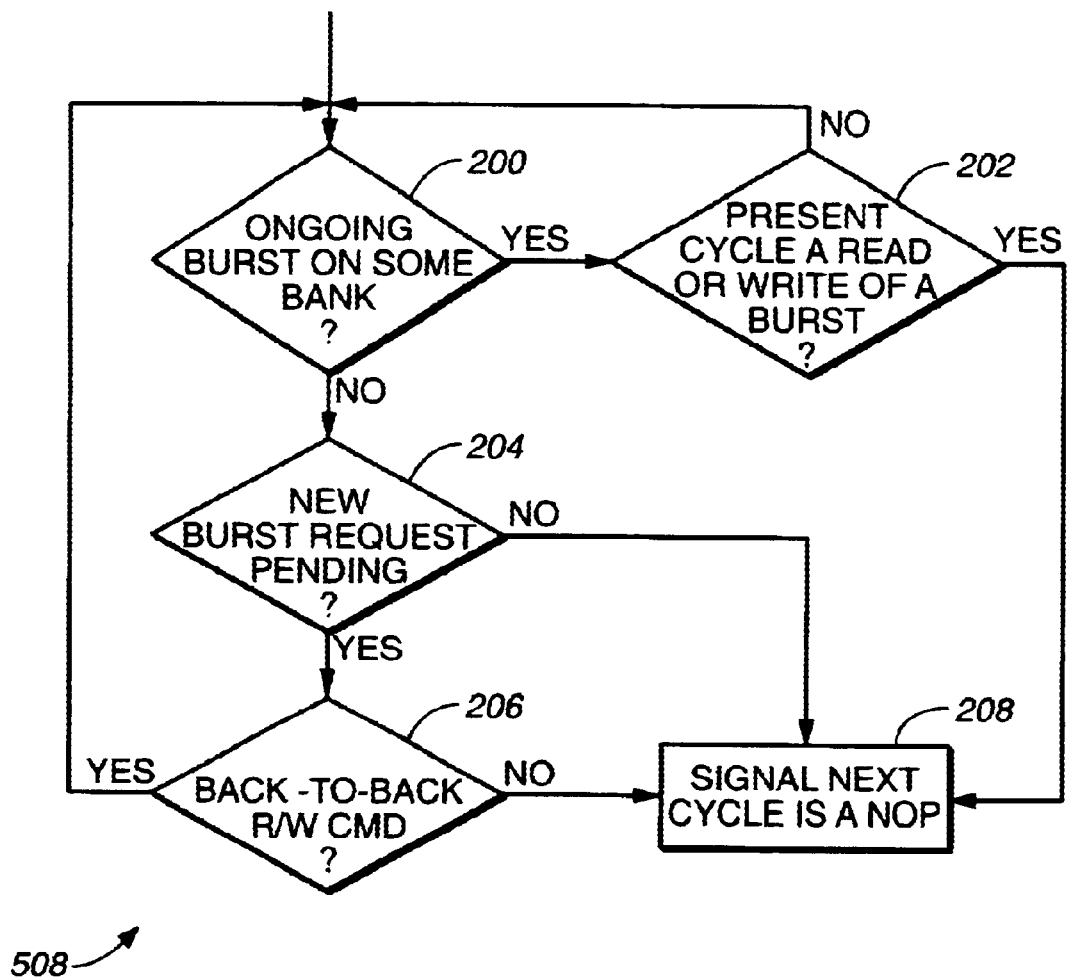
FIG._2

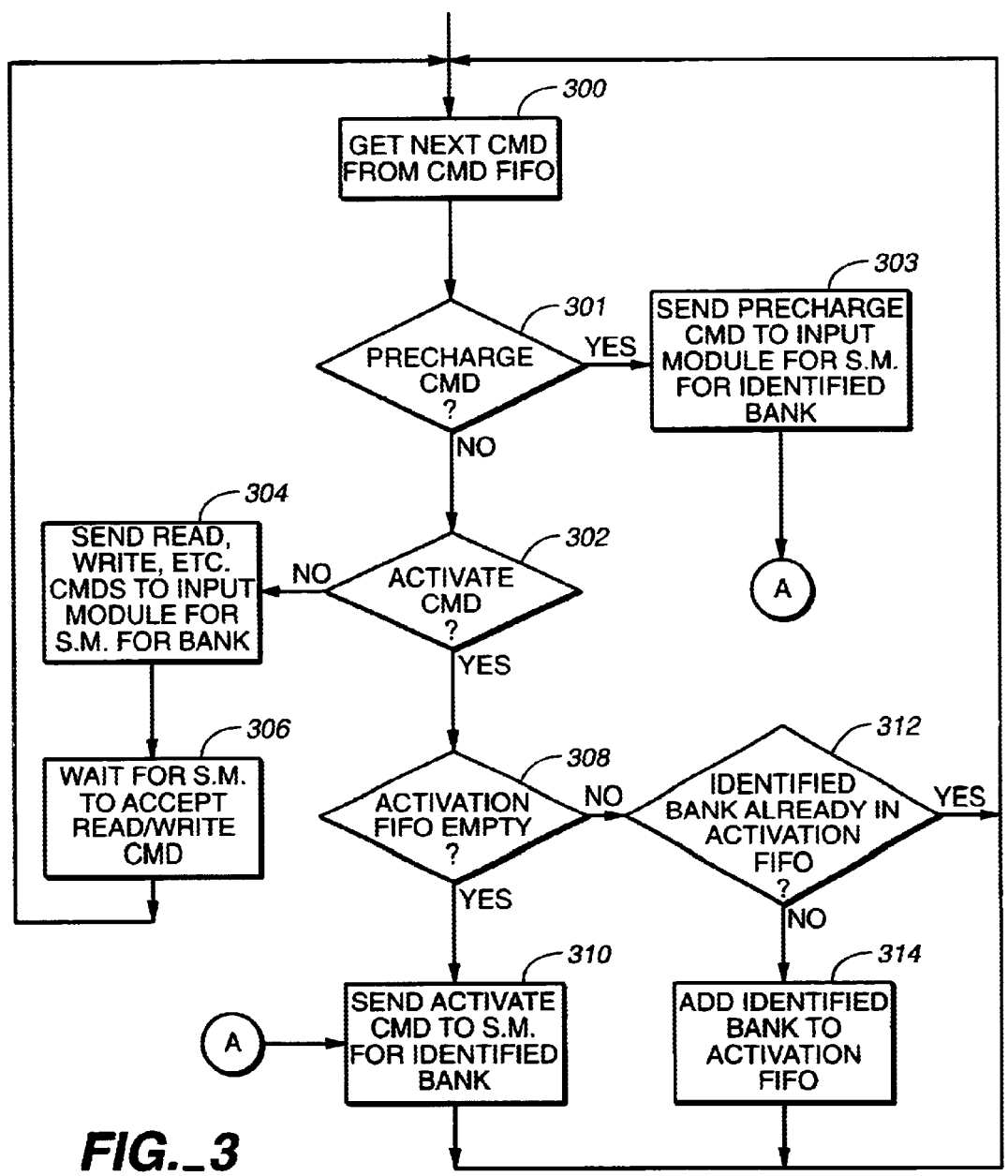
FIG._3

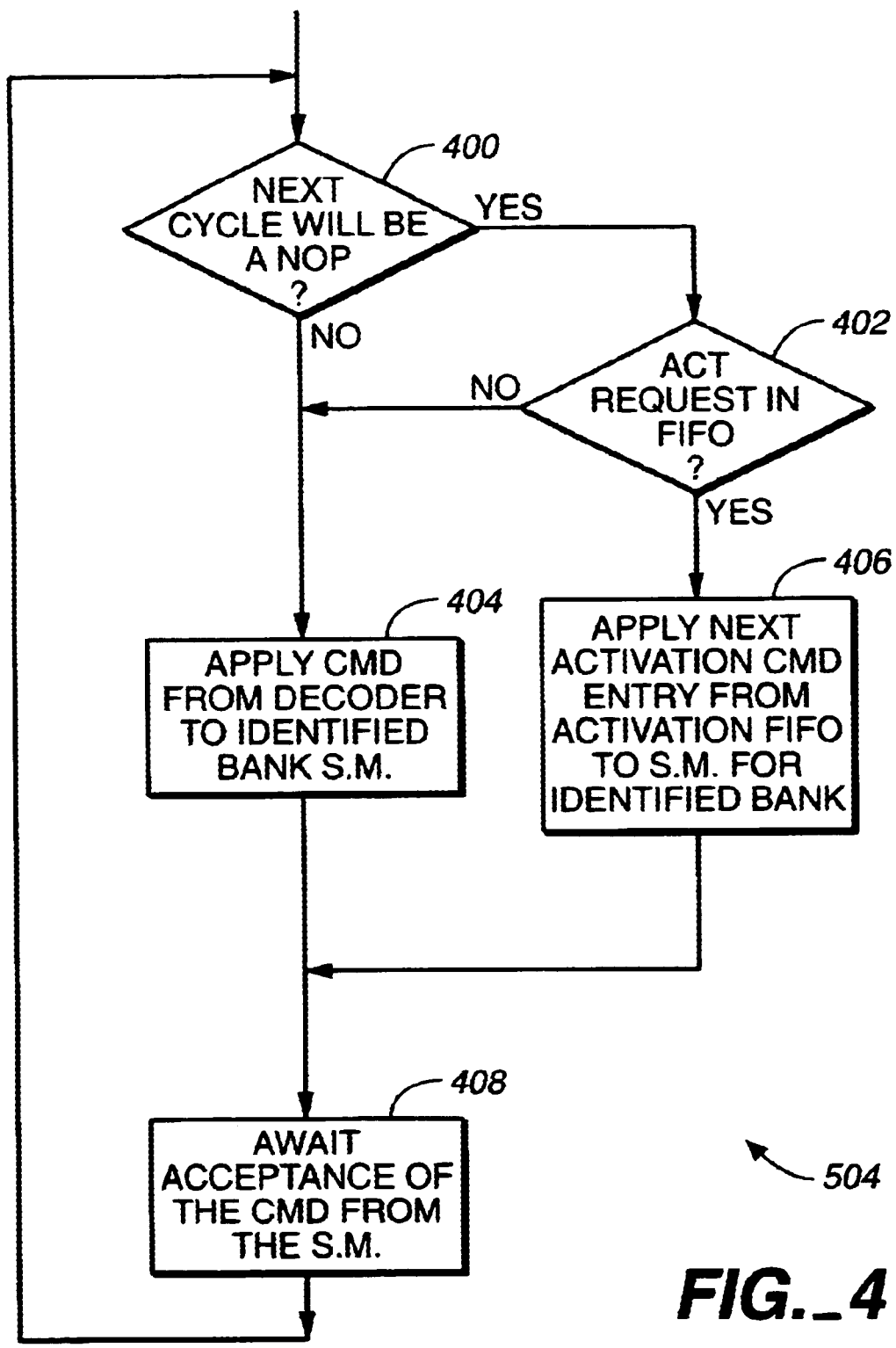
FIG._4

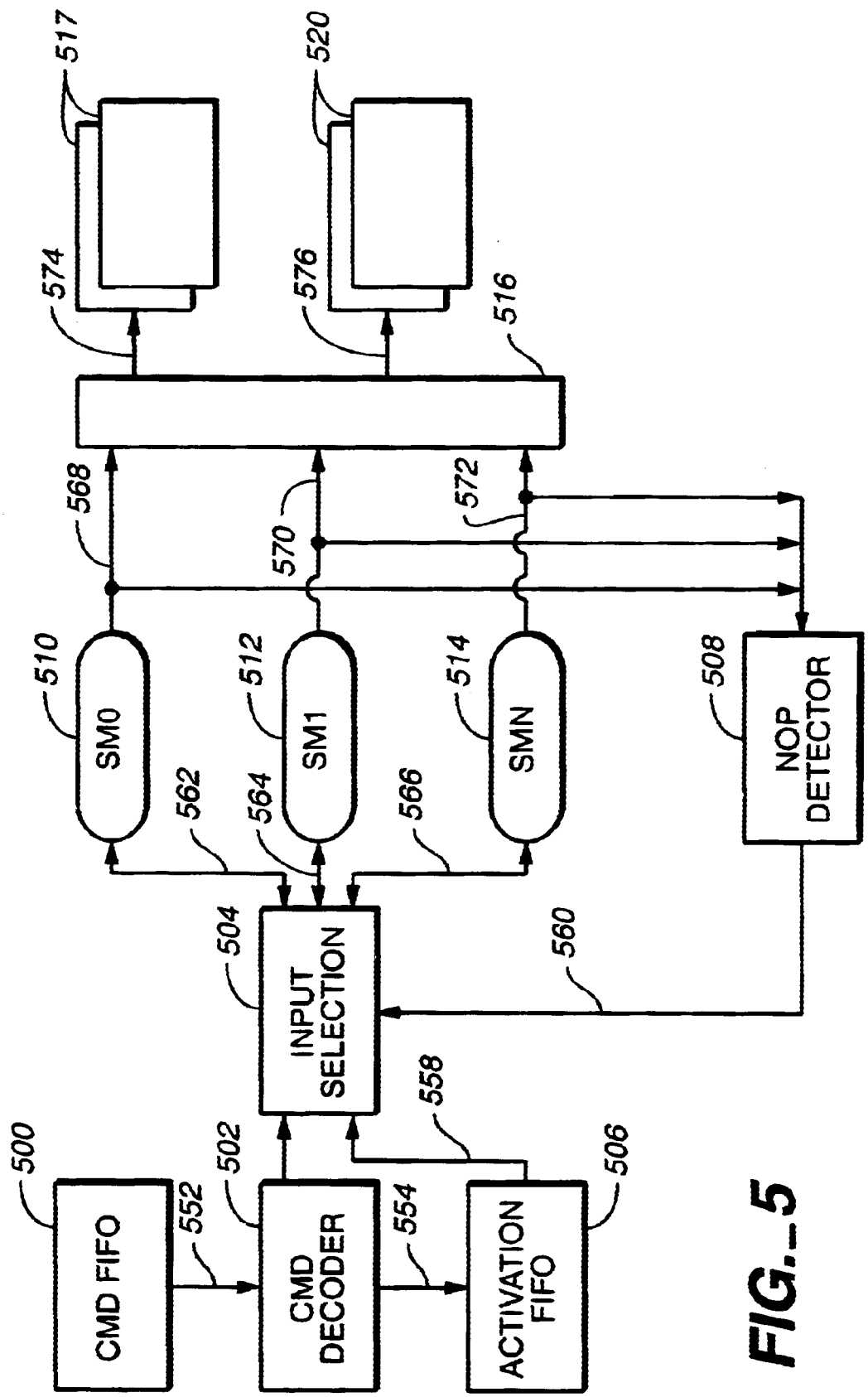
FIG._5

| Stat | Descriptions |
|---|---|
| INIT | All banks in both chips are in the process of initialization. It's entered at system reset. |
| CLOSE | The bank is close. It should be opened before any read/write burst. |
| ACTIVATE | The bank is in the process of activation. |
| OPEN | The bank is open. Read or Write burst can start immediately. |
| READ | A read burst is in the process to this bank. |
| WRITE | A write burst is in the process to this bank. |
| PREALL | All banks in both chips are being precharged for auto refresh. |
| PRERDY | The bank is ready to be precharged for auto/self refresh. |
| PRE | The bank is in the process of precharge for the future read/write burst. |
| AUTOREF | All banks in both chips are in the process of auto refresh. |
| SELFREF | All banks in both chips are in the state of self refresh power down. |
| REFEXIT | All banks in both chips are in the process of exiting self refresh power down. |
| CAL | All banks in both chips are in the process of calibration. |

*FIG._6*

| Input | Descriptions |
|---|---|
| nop_xxx | No operation - where xxx is any of the above states. This type of commands will not cause any state transition. |
| q_reset | System reset. All banks go to INIT state. |
| init_close | All banks go from INIT state to CLOSE state. |
| autoref_close | All banks go from AUTOREF state to CLOSE state. |
| refexit_close | All banks go from REFEXIT state to CLOSE state. |
| cal_close | All banks go from CAL state to CLOSE state |
| preall_selfref | All banks go from PREALL state to SELFREF state. |
| preall_autoref | All banks go from PREALL state to AUTOREF state. |
| selfref_refexit | All banks go from SELFREF state to REFEXIT state. |
| close_activate | This bank goes from CLOSE state to ACTIVATE state. |
| pre_activate | This bank goes from PRE state to ACTIVATE state. |
| read_read | This bank goes from READ state to READ state. |
| open_read | This bank goes from OPEN state to READ state. |
| activate_read | This bank goes from ACTIVATE state to READ state. |
| write_write | This bank goes from WRITE state to WRITE state. |
| open_write | This bank goes from OPEN state to WRITE state. |
| activate_write | This bank goes from ACTIVATE state to WRITE state. |
| activate_open | This bank goes from ACTIVATE state to OPEN state. |
| read_open | This bank goes from READ state to OPEN state. |
| write_open | This bank goes from WRITE state to OPEN state. |
| open_pre | This bank goes from OPEN state to PRE state. |
| read_pre | This bank goes from READ state to PRE state. |
| prerdy_preall | All banks go from PRERDY state to PREALL state. |
| close_prerdy | This bank goes from CLOSE state to PRERDY state. |
| pre_prerdy | This bank goes from PRE state to PRERDY state. |
| open_prerdy | This bank goes from OPEN state to PRERDY state. |
| autoref_cal | All banks go from AUTOREF state to CAL state. |

*FIG._7*

| Input Command | Current State | Output Command | Next State |
|---|---|---|---|
| nop_xxx | any | nop | unchanged |
| q_reset | any | N/A | INIT |
| init_close | INIT | nop | CLOSE |
| autoref_close | AUTOREF | nop | |
| refexit_close | REFEXIT | nop | |
| cal_close | CAL | nop | |
| preall_selfref | PREDALL | refs | SELFREF |
| preall_autoref | PREALL | refa | AUTOREF |
| selfref_refexit | SELFREF | srex | REFEXIT |
| close_activate | CLOSE | act | ACTIVATE |
| pre_activate | PRE | act | |
| read_read | READ | read | READ |
| open_read | OPEN | read | |
| activate_read | ACTIVATE | read | |
| write_write | WRITE | write | WRITE |
| open_write | OPEN | write | |
| activate_write | ACTIVATE | write | |
| md_activate_open | ACTIVATE | nop | OPEN |
| read_open | READ | nop | |
| write_open | WRITE | nop | |
| open_pre | OPEN | pre | PRE |
| read_pre | READ | pre | |
| prerdy_preall | PRERDY | prea | PREALL |
| close_prerdy | CLOSE | nop | PRERDY |
| pre_prerdy | PRE | nop | |
| open_prerdy | OPEN | nop | |
| autoref_cal | AUTOREF | nop | CAL |

*FIG._8*

| Output | Descriptions |
|---|---|
| nop | NOP: cs[i]=1; ras=x; cas=x; we=x; addr=x; bank=x; |
| prea | PREA: cs[i]=0; ras=0; cas=1; we=0; addr[8/10]=1; bank=x; |
| refa | REFA: cs=0; ras=0; cas=0; we=1; addr=x; bank=x; |
| act | ACT: cs[i]=0; ras=0; cas=1; we=0; addr=row_addr; bank=bank_addr; |
| read | READ: cs[i]=0; ras=1; cas=0; we=1; addr=column-addr; addr[8/10]=0; bank=bank_addr; |
| write | WRITE: cs[i]=0; ras=1; cas=0; we=0; addr=column-addr; addr[8/10]=0; bank=bank_addr; |
| pre | PRE: cs[i]=0; ras=0; cas=1; we=0; addr[8/10]=0; bank[1:0]=x; |
| refs | REFS: cs=0; ras=0; cas=0; we=1; addr=x; bank=x; cke=0 |
| srex | SREX: cs=x; ras=x; cas=x; we=x; addr=x; bank=x; cke=1 |
| emrs | EMRS: cs=0; ras=0; cas=0; we=0; addr=op-code; bank=1 |
| mrs | EMR: cs=0; ras=0; cas=0; we=0; addr=op-code; bank=0 |

FIG._9

|  | 0 | 1 | 2 | 3 | 4 | 5 | 6 | 7 | 8 | 9 | 10 |
|---|---|---|---|---|---|---|---|---|---|---|---|
| bank 0 | pre | nop | nop | act | nop |  |  |  |  |  |  |
| bank 1 |  | pre | nop | nop | nop | act | nop |  |  |  |  |
| bank 2 |  |  | pre | nop | nop | nop | nop | act | nop |  |  |
| bank 3 |  |  |  | nop | pre | nop | nop | nop | nop | act | nop |
| result | pre0 | pre1 | pre2 | act0 | pre3 | act1 | nop | act2 | nop | act3 | nop |

FIG._10

|  | 0 | 1 | 2 | 3 | 4 | 5 | 6 | 7 | 8 | 9 | 10 |
|---|---|---|---|---|---|---|---|---|---|---|---|
| bank 0 | pre | nop | nop | act | nop |  |  |  |  |  |  |
| bank 1 |  | pre | nop | nop | act | nop |  |  |  |  |  |
| bank 2 |  |  | pre | nop | nop | act | nop |  |  |  |  |
| bank 3 |  |  |  | nop | nop | nop | pre | nop | nop | act | nop |
| result | pre0 | pre1 | pre2 | act0 | act1 | act2 | pre3 | nop | nop | act3 | nop |

FIG._11

|        | 0    | 1   | 2    | 3    | 4    | 5    | 6    | 7   | 8   | 9    | 10  | 11   | 12  |
|--------|------|-----|------|------|------|------|------|-----|-----|------|-----|------|-----|
| bank 0 | pre  | nop | nop  | nop  | nop  |      |      |     |     |      |     |      |     |
| bank 1 |      | nop | nop  | nop  | nop  | act  | nop  |     |     |      |     |      |     |
| bank 2 |      |     |      |      |      |      | pre  | nop | nop | act  | nop |      |     |
| bank 3 |      |     |      |      |      |      |      | nop | nop | nop  | nop | act  | nop |
| result | pre0 | nop | nop  | act0 | nop  | act1 | pre2 | nop | nop | act2 | nop | act3 | nop |

FIG._12

|        | 0    | 1   | 2     | 3    | 4     | 5    | 6   | 7   | 8    | 9   |
|--------|------|-----|-------|------|-------|------|-----|-----|------|-----|
| bank 0 | pre  | nop | nop   | act  | nop   |      |     |     |      |     |
| bank 1 |      |     | read  | nop  |       |      |     |     |      |     |
| bank 2 |      |     |       | nop  | read  | nop  |     |     |      |     |
| bank 3 |      |     |       |      |       | pre  | nop | nop | act  | nop |
| result | pre0 | nop | read1 | act0 | read2 | pre3 | nop | nop | act3 | nop |

|        | 0    | 1     | 2   | 3     | 4   | 5    | 6   | 7    | 8   | 9    | 10  | 11  | 12   | 13  |
|--------|------|-------|-----|-------|-----|------|-----|------|-----|------|-----|-----|------|-----|
| bank 0 | pre  | nop   | nop | nop   | act | nop  |     |      |     |      |     |     |      |     |
| bank 1 |      | read  | nop | read  | nop | read | nop | read |     |      |     |     |      |     |
| bank 2 |      |       | nop | nop   | nop | nop  | act | nop  | nop | nop  |     |     |      |     |
| bank 3 |      |       |     |       |     |      |     |      |     | pre  | nop | nop | act  | nop |
| result | pre0 | read1 | nop | read1 | act0| read1| act2| read1| nop | pre3 | nop | nop | act3 | nop |

FIG._15

|        | 0    | 1     | 2   | 3    | 4    | 5     | 6    | 7    | 8   | 9     | 10   | 11    | 12  | 13    | 14   | 15    | 16   |
|--------|------|-------|-----|------|------|-------|------|------|-----|-------|------|-------|-----|-------|------|-------|------|
| bank 0 | pre  | nop   | nop | act  | nop  | nop   | nop  | nop  | nop |       |      |       |     |       |      |       |      |
| bank 1 |      | read  | nop | read | nop  | read  | nop  | read | nop | read  | nop  | read  | nop | read  | nop  | read  | nop  |
| bank 2 |      |       | nop | nop  | nop  | nop   | nop  | nop  | nop | nop   | nop  | nop   | nop | nop   | nop  |       |      |
| bank 3 |      |       |     |      |      |       |      |      |     | pre   | nop  | nop   | nop | nop   | act  | nop   |      |
| result | pre0 | read1 | nop | read1| act0 | read1 | nop  | read1| nop | read2 | pre3 | read2 | nop | read2 | act3 | read2 | read2|

METHODS AND STRUCTURE FOR SEQUENCING OF ACTIVATION COMMANDS IN A HIGH-PERFORMANCE DDR SDRAM MEMORY CONTROLLER

BACKGROUND OF THE INVENTION

1. Field of the Invention

The present invention relates to high-performance memory controllers and more specifically relates to methods and structure for improved sequencing of precharge and activation commands in a high-performance SDRAM memory controller.

2. Discussion of Related Art

In present day digital electronic systems, high performance memory subsystems are comprised of a plurality of banks of memory with each bank comprising a plurality of memory chip devices. High-performance memory chip devices typically provide for burst modes of access to help optimize bandwidth utilization of the memory device by an associated master or controlling device. Generally a "burst" operation is one where a single read or write command may access a sequence of locations within the memory chip device in rapid succession without requiring further sequences of logic signals applied to the memory chip device to access each sequential location. Further, multiple banks of such memory chip devices may be operated in a variety of parallel fashions to overlap processing in one bank of memory with processing in other banks of memory. Such features are well-known in the art to improve performance of memory subsystems.

In general, present-day high-performance memory subsystems utilize a memory controller device between the master device intended to utilize the memory subsystem (i.e., a general purpose processor or other special-purpose processing devices) and the memory subsystem. Such a memory controller device is intended to shield the master device from details of a controlling the memory chip devices and the memory banks to achieve optimal memory subsystem performance. For example, such memory controller devices assume responsibility for controlling the memory chip devices to best utilize burst mode operations and further controlling the multiple banks of memory to permit significant overlap in processing memory operations among the plurality of banks.

A number of current high-performance memory subsystems utilize SDRAM (synchronous dynamic random access memory) memory chip devices as well as variants of such SDRAM devices that provided double data rate operations (i.e., DDR SDRAMs). As used herein, "SDRAM" refers to both standard SDRAM memory devices and DDR SDRAM memory devices. Features of the present invention as discussed further herein below are applicable to both types of SDRAM devices as well as other memory chip devices.

As is known in the art, industry standard specifications provide for a command structure in accessing SDRAM devices. For example, JEDEC standard JESD79 provides a standardized specification for commands used in accessing DDR SDRAM devices (published by the JEDEC Solid State Technology Association in June of 2000 and available publicly at www.jedec.org). Similar command structures are defined for access to all SDRAM devices as well as other types of memory chip devices. A memory controller device responds to memory operations requested by the master device and translates the request into appropriate SDRAM commands in an appropriate sequence to store or retrieve the requested data to or from the memory chip devices. The memory controller device therefore assumes responsibility for optimal use of available bandwidth for the memory devices.

Addressing a location (or sequence of locations) in a memory chip device involves selecting a column and a row (also referred to as a "page"). The standardized command structure for accessing SDRAM devices (and other memory chip devices) requires that the desired page or row of a memory device must be open or active prior to reading or writing data from or to a memory location in that page. An "activate" command is typically used to specify the page or row to be opened prior to issuance of a read or write command accessing locations within that page. Typically, the activate command also specifies which bank of a multi-bank memory subsystem is to be activated. An active or open page is closed or made inactive by a "precharge" operation. A typical sequence therefore involves closing a previously open page with a precharge command, opening a next page to be accessed with an activate command, and then issuing an appropriate read or write command to retrieve or store the desired data from or. to memory locations in the open page.

The synchronous nature of SDRAM devices generally requires that some command be present on the input signal paths of the memory chip devices at each clock pulse applied to the memory chip device. When a read or write command is issued that requests a burst of a number of sequential locations, one or more clock cycles may be applied to the memory chip device before another read or write operation is permitted. To assure that some command is applied to the input of the memory chip device, typical memory controller devices generate nop commands to fill the otherwise unused command sequences during burst cycles. Other sequences of commands also require application of nop commands during latency periods awaiting completion of an earlier issued command to the memory chip device. For example, there is typically a latency following issuance of an activate command before the specified page is open and ready for a read or write command. Such latency periods are typically filled with nop commands by memory controller devices.

It is a constant problem to improve memory bandwidth utilization to thereby improve overall system performance for an associated system. Methods and structures that improve memory subsystem bandwidth utilization are therefore desirable. In particular, it is desirable to reduce the latency between activation of a page of memory and access to the opened page.

SUMMARY OF THE INVENTION

The present invention solves the above and other problems, thereby advancing the state of useful arts, by providing methods and structure for inserting activate commands in place of nop commands generated by the memory controller device. In particular, methods and structure of the present invention determine that future read or write operations may require activation of a new page. In response to detecting a need for activation of another page in the near future, and appropriate activate command is inserted in place of a nop command in the standard sequence of commands issued to the SDRAM device.

Still more specifically, the present invention maintains a FIFO queue of activate commands pending for memory pages required by future read or write operations issued to an SDRAM memory device. The FIFO preferably has a depth equal to the number of banks in the multibank memory subsystem architecture. As future read or write operations are detected in the command stream issued to the memory controller for other banks of memory, an activate request will be queued in the FIFO for the corresponding page of the corresponding bank. As command sequences are generated by the memory controller for application to the SDRAM memory device, each nop command cycle may be replaced by an appropriate activate command for a next page to be accessed by future read or write commands sensed by the memory controller. The methods and structure of the present invention therefore help improve utilization of memory bandwidth in high-performance memory subsystems by inserting activate commands (also referred to herein as "hidden activates") in advance of reading or writing of the associated open page. The required page will therefore be ready for access by an appropriate read or write command sooner than would otherwise be the case in a memory subsystem devoid of the present invention. This reduced latency between page activation and page access improves memory bandwidth utilization and hence overall system performance.

A first aspect of the invention provides a method operable in a memory controller for improving memory bandwidth utilization comprising the steps of: directing a first burst memory access command from the memory controller to a first bank of the multiple banks of memory in response to receipt of a first memory access request from a master device wherein the first burst memory access command requires multiple clock periods to complete; sensing, within the memory controller, receipt of a next memory access request from a master device during the multiple clock periods wherein the next memory access command requires access to a second bank of the multiple banks of memory; and directing an activate command from the memory controller to the second bank during the multiple clock periods to overlap operation of the activate command with the period of time.

Another aspect of the invention further provides that: the step of sensing includes the step of: queueing an activate request in an activate queue associated with the memory controller, and that the step of directing an activate command includes the step of: unqueueing the activate request from the queue to generate the activate command to be directed to the second bank.

Another aspect of the invention provides a method operable in the memory controller for improving memory bandwidth utilization comprising the steps of: receiving high level commands for burst memory operations from the master device; operating a state machine for each bank of the multiple banks to generate synchronous memory commands for the each bank in response to high level commands directed to the each bank wherein the synchronous memory commands include read burst commands, write burst commands, nop commands, activate commands and precharge commands; and sequencing the synchronous memory commands for application to the multiple banks to replace nop commands generated for a first bank with precharge and activate commands for a second bank.

Yet another aspect further provides that the step of sequencing comprises the steps of: prioritizing the synchronous memory commands generated for the each bank such that read commands and write commands are applied to corresponding bank in the order received from the master device and such that a read command or a write command for an active row of a bank takes precedence over any other synchronous memory command and such that an activate command or a precharge command for an inactive row takes precedence over a nop command and over a read command or a write command for the inactive row; selecting a command of the synchronous commands for application to a corresponding bank; and applying the command to the corresponding bank.

Still another aspect of the invention provides for a memory controller including: an activation FIFO for queueing activation requests for identified banks of the multiple banks; a command decoder coupled to the activation FIFO for decoding high level commands received from an associated controlling device and for queueing activation requests derived from the high level commands in the activation FIFO; a plurality of state machines operable to process the decoded high level command and to generate corresponding sequences of low level command cycles for application to the SDRAM memory device wherein each state machine operates on behalf of a corresponding bank of the multiple banks; an input selector coupled to the command decoder and to the activation FIFO and to the plurality of state machine to select between a decoded command from the command decoder and an activation request in the activation FIFO for application to the state machine for a bank identified in the selected decoded command or in the selected activation request; and a nop detector for detecting when a next command cycle generated by the plurality of state machines will be a nop command cycle and for generating a signal indicative of such a nop command cycle and for applying the signal to the input selector, whereby the memory controller replaces a nop command cycle with an activate command in accordance with queued activation requests in the activation FIFO.

BRIEF DESCRIPTION OF THE DRAWINGS

FIG. 1 is a block diagram of a typical application of a memory controller as presently known in the art.

FIG. 2 is a flowchart describing operation of a nop detector in a memory controller in accordance with the present invention.

FIG. 3 is a flowchart describing operation of a command decoder of a memory controller in accordance with the present invention.

FIG. 4 is a flowchart describing operation of an input selector of a memory controller in accordance with the present invention.

FIG. 5 is a block diagram of portions of a memory controller in accordance with the present invention to resequence low level memory commands to improve memory bandwidth utilization by overlapping activation of banks with burst activity on other banks.

FIGS. 6 through 9 are tables that describe the structure and operation of a state machine in a memory controller of the present invention to generate low level memory commands from corresponding received high level memory commands.

FIGS. 10 through 15 are tables depicting exemplary sequences of replacing nop commands with hidden activation commands to overlap bank activation with activity on other banks.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a typical system as presently known in the art wherein a memory controller 104 serves as an interface between master devices and multiple banks of memory. As depicted in FIG. 1, CPU 100 and DMA controller 102 are typical master devices that generate memory requests to be processed by memory banks 106, 108 or 110. CPU 100 or DMA controller 102 generate memory requests and apply the requests via the bus 150 to memory controller 104. Those skilled in the art will readily recognize that a bus arbiter device (not shown) manages the coordination of such multiple master devices issuing memory requests to memory controller 104.

Memory controller 104 receives such requests and directs the read or write operations to appropriate banks of memory 106, 108 or 110. Each bank of memory 106, 108 and 110 is comprised of a plurality of memory chip devices 107, 109 and 111, respectively. As is presently known in the art, memory controller 104 issues low-level memory operation commands via bus 152 to appropriate memory chips 107, 109 or 111 in identified memory banks 106, 108 or 110, respectively. As noted above, a number of industry standards exist for definition of the command structures supported by such memory chip devices. One popular type of memory device is a synchronous dynamic random access memory (SDRAM). Double data rate SDRAMs (DDR SDRAMs) also support similar command structures and provide higher performance for memory operations. Typical of such command structures is the inclusion of read burst and write burst commands to read or write a sequence of memory locations without requiring individual commands to be issued for each location to be read or written. The read and write commands each require that the row or page of the memory chip device containing the memory locations to be accessed are "open" or "active" prior to issuance of the read or write command. The required page is opened by issuance of an activate command prior to issuance of the corresponding read or write burst commands. As noted above, there is typically a latency period following issuance of the activate command before the corresponding read or write may be issued. The present invention improves memory bandwidth utilization, and thereby improves overall system performance, by providing methods and associated structure for reducing the performance impact of such latency periods by overlapping activate operations and read and write operations among a plurality of memory banks (106, 108 and 110 for example).

FIG. 5 is a block diagram depicting structure of the present invention operable within an enhanced memory controller 104 to provide for sequencing of activation commands to provide for overlapping of the required latency period following an activate command with present read and write burst operations in other banks. In particular, high-level memory operation commands are received via bus 550 and stored in command FIFO 500. As noted above, typically such high-level commands would be received from a bus arbiter (not shown) that coordinates memory requests generated by a plurality of master devices coupled to bus 550.

Command decoder 502 retrieves queued commands from command FIFO 500 via path 552 and parses the received commands to identify a selected bank associated with the command and to identify the particular command received. Command decoder 502 analyzes the received high level commands and generates appropriate information to be directed to a state machine associated with each bank of memory. In particular, command decoder applies its generated output signals via path 556 to input selection element 504. Input selection element 504 determines when the parsed command identified by command decoder 502 and applied to path 556 is to be forwarded to the state machine corresponding to the identified bank of memory. When appropriate, input selection element 504 applies the parsed command to state machine SM0 510, SM1 512, or SMN 514, via paths 562, 564 and 566, respectively. The state machine to be accessed is identified by the bank number in the parsed command received from command decoder 502.

Input selection element 504 also receives queued activation requests via path 558 from activation FIFO 506. Activation requests are queued in activation FIFO 506 by operation of command decoder 502 through path 554. Input selection element 504 selects either a queued activation request received on its input path 558 or a new command decoded by command decoder 502 and applied to input path 556. Criteria for determining which input is selected by input selection element 504 are described further herein below in conjunction with nop detector 508.

Having selected an appropriate input request, input selection element 504 applies the selected command sequence to the state machine corresponding to the identified bank of the selected input request. As noted above, SM0 510, SM1 512 and SMN 514 are identical state machines each operating on behalf of a corresponding bank of memory. The state machines operate in parallel and cooperatively with other elements of FIG. 5 to coordinate overlapping operations on each of the independent banks of memory in the system. State machines 510, 512 and 514 generate low-level memory chip commands applied to their respective output paths 568, 570 and 572. Physical interface layer 516 applies the low-level memory commands to appropriate memory chip devices 518 and 520 via paths 574 and 576, respectively. Those skilled in the art will readily recognize that multiple memory chip devices and multiple banks may be physically connected to the interface layer 516 via any number of signal paths as required for the particular memory application. Further, those skilled in the art will recognize that any number of banks of memory may be configured in the system and a corresponding number of state machines operable within the memory controller 104. FIG. 5 is therefore intended merely as representative of all such memory subsystem configurations wherein a memory controller coordinates activity on behalf of a plurality of banks of memory.

Nop detector 508 monitors commands generated by state machines 510 through 514 and detects when the next command cycle applied to the SDRAM devices by the state machines will include a nop command cycle. When such a cycle is detected, nop detector 508 generates an output signal on path 560 applied to input selection element 504 indicative of an opportunity for input selection element 504 to replace a nop cycle with a queued activation request. This key feature of the present invention enables replacement of nop commands with activation commands queued for future read and write operations and thereby provides for possible overlap of the latency following issuance of an activate command with other present burst activities on other SDRAM memory banks. Overlapping this latency period with other memory burst activity reduces the impact of such latencies on system performance.

Nop detector 508 is operable in accordance with rules that determine an appropriate next cycle for insertion of a queued activation requests. Methods operable within nop detector 508, input selection element 504, and command decoder 502 are discussed further herein below.

State machines 512 through 514 are preferably implemented as standard finite state machines for generating low-level SDRAM command sequences in accordance with received commands generated through input selection element 504. Such state machines are well-known to those of ordinary skill the art. The tables of figures present an exemplary state machine design for receiving input command sequences from input selection element 504 and for generating corresponding low-level SDRAM commands for application to a corresponding bank of memory.

Those skilled in the art will recognize that a ubiquitous clock signal (not shown) is applied to the devices depicted in FIG. 5. Such standard clocking designs are well-known to those skilled in the art and need not be discussed further here.

FIG. 6 is a table describing the states of such an exemplary state machine. FIG. 7 is a table of input commands received by the state machine from the command decoder via the input selection element. Those skilled in the art will note that the names of received commands and the descriptions suggest the structure and operation of the state machine. FIG. 8 describes in tabular form the transitions from a "Current State" to a "Next State" based upon receipt of an "Input Command." In addition, where applicable, the table also identifies a low-level SDRAM "Output Command" generated in conjunction with the identified state transition. FIG. 7 includes a simple description of the state machine in one exemplary preferred embodiment and FIG. 8 provides additional details of that same exemplary state machine. Lastly, the table of FIG. 9 describes the various SDRAM "Output Commands" in terms of the SDRAM signals generated to represent the corresponding command. Those skilled in the art will recognize a wide variety of equivalent structures and state machines for generating sequences of SDRAM low-level command sequences required for activation, read and write operations. Further, the specific Output Commands are unique to a each particular SDRAM device and may vary accordingly. Also of note, the described, exemplary state machine incorporates features relating to refresh of the SDRAM chip device. Such features are well-known to those skilled in the art and may vary in accordance with the particular memory chip devices selected for a particular application. Those skilled in the art will therefore recognize that the state machine described by FIGS. 6–9 is intended to be suggestive of all such state machine used for generating command sequences to SDRAM devices. Particular implementations may vary in accordance with well-known design choices by the engineer.

As noted above, element 508 of FIG. 5 monitors the low-level SDRAM commands generated by each bank's state machine. Nop detection element 508 determines from the monitored low-level commands whether the next command cycle from the state machines will generate a nop command sequence for all banks of memory. Such a detected command cycle is useful for input selection element 504 of FIG. 5 to determine when a previously queued activation request may replace such a detected nop cycle. FIG. 2 is a flowchart describing the operation of nop detector 508 to detect when a next cycle of the SDRAM commands will signify such a nop cycle.

Element 200 first detects whether the memory controller is presently in process of an ongoing read or write burst operation. If so, element 202 then determines whether the present cycle is a read or write command of an ongoing burst for one of the banks. If so, processing continues with element 208 to generate a signal indicative of the next cycle being a nop command cycle. If the present cycle is a read or write for an ongoing burst as distinct from the last read or write in a burst or a non-burst single cycle, then the next cycle is assured to be a nop cycle (in the absence of the features of the present invention). Such a detected nop cycle may be used as described herein to insert a hidden precharge or activate command on another bank not involved in the present ongoing burst. If element 202 determines that the present cycle is not a read or write command of an ongoing burst, processing continues by looping back to element 200 to test the next command cycle applied to the SDRAM memory devices.

If element 200 determines that no bank is presently engaged in an ongoing burst operation processing continues with element 204. Priority rules of the nop detector of the present invention require that a pending new burst request be started as soon as possible. If element 204 determines that there is no pending new burst request, processing continues with element 208 as above to signal that the next command cycle is assured to be a nop command cycle. If element 204 determines that there is a new burst request pending, then element 206 determines whether a next burst request may be started immediately (often referred to as "back-to-back" burst requests). If not, then the next cycle must be a nop command cycle and element 208 so indicates. If back-to-back bursts are permitted, processing loops back to element 200 to await the next command cycle for evaluation (permitting the new pending burst request to comment in this present cycle).

As noted above, the signal generated by operation of element 208 is applied to input selection element 504 to enable the input selection element to insert a previously queued activation request to replace a detected nop SDRAM command cycle. Those of ordinary skill in the art will readily recognize a variety of other conditions that may be evaluated to determine that the next cycle is assured to be a nop command operation. FIG. 2 is therefore intended as representative of all such detection sequences. Well-known design choices in implementing the method of FIG. 2 may permit numerous other detected conditions for generation of the desired signal by operation of element 208. Each particular application of an SDRAM memory controller may test for specific conditions of the particular application where it may be determined that the next SDRAM command cycle is assured to be a nop in which a hidden precharge or activate may be inserted.

FIG. 3 is a flowchart describing the method of operation of command decoder element 502 of FIG. 5. As noted above, command decoder 502 is operable to receive high-level memory operations and to decode the high-level commands into lower level sequences identifying particular address ranges and banks associated with the high-level command. The decoded or parsed input is then applied to input selection element 504 of FIG. 5 as discussed above. In particular, command decoder 502 is operable to determine when an activation of a particular bank should be added to the activation FIFO for insertion as soon as possible into the generated SDRAM command sequence.

Element 300 is first operable to get a next command from the command FIFO. As noted above, commands are applied to the command decoder through a command FIFO by the bus arbiter controlling the activity of multiple master devices on a common bus (or directly by an appropriate master device). Having retrieved the next command from the command FIFO, element 301 is operable to determine whether the command is an explicit request to close a bank (i.e., a precharge command). If so, element 303 is operable to immediately direct the precharge command to the state machine corresponding to the identified bank to be closed. Processing then continue at element 310 (label "A") to send an activate command to the state machine for the identified bank in anticipation of the next use of the bank. An explicit precharge is usually coupled with an associated activation of the same bank for a next burst operation on the bank.

If element 301 determines that next command is not a precharge, element 302 is next operable to determine whether the retrieved command is an activation request. If not, element 304 is then operable to send the read, write or other command to the input selection element for application to an identified bank of memory. Element 306 then awaits acceptance of the command by the corresponding state machine controlling operation of the identified bank of memory. Once the transmitted read or write command is accepted by the corresponding state machine, processing continues within the command decoder by looping back to element 300 to retrieve a next command from the command FIFO. Acceptance of the read or write command by the corresponding state machine does not indicate completion of the corresponding read or write operation, but rather indicates that the state machine is prepared to begin processing the read or write sequence identified by the retrieved command. Further, those skilled in the art will recognize that a variety of other high-level commands may be forwarded to the corresponding state machine by operation of elements 304 and 306. Read, write, precharge and activate commands are the principle commands of interest with respect to the methods and structure of the present invention. For simplicity of description only those commands are addressed herein. Those skilled in the art will readily understand the extension of the methods and structure of the present invention to process other commands.

If element 302 determines that the retrieved command is an activate command, intended to open an identified page of an identified bank, processing continues at element 308 to determine whether the activation FIFO is presently empty. If the activation FIFO is presently empty (no activate requests are presently queued) element 310 transfer they retrieved precharge or activate command directly to the corresponding state machine through input selection element 504 of FIG. 5. Processing then continues by looping back to element 300 to retrieve a next command. If element 308 determines that the activation FIFO is not presently empty, element 312 is next operable to determine whether the identified page in the identified bank already appears in an entry of the activation FIFO. If not, element 314 is operable to add the identified page and bank into an the next entry of the activation FIFO to permit activation of the corresponding page and bank as soon as possible by operation of the input selection element 504. In either case, processing continues by looping back to element 300 to retrieve a next command from the command FIFO.

If the activation FIFO is presently empty as determined by element 308, the activation command (or precharge) is passed directly to the state machine through the input selection element to assure that the activation will occur as soon as possible. When queuing an activation request, element 312 determines if a similar entry for the same bank is already present in the activation FIFO. If a similar entry for the bank is already in the activation FIFO, the new request is dropped since the queued request will handle the subsequent activation request for the same bank—even if for another page in the bank. This helps assure that the activation FIFO will not be overflowed by duplicative entries for a single bank. In this manner the activation FIFO may be limited to a number of entries equal to the number of banks of memory in the system.

FIG. 4 is a flowchart describing a method operable within input selection element 504 of FIG. 5. As described above, input selection element 504 receives new commands from command decoder element 502 and also receives input in the form of queued activation requests from activation FIFO 506. The signal generated by nop detector element 508 indicates that the next SDRAM. command cycle will be a nop cycle. Based on that input, input selection element 504 determines whether a new command from command decoder element 502 or a queued activation request from activation FIFO 506 should be applied to a corresponding state machine. Outputs generated by input selection element 504 are applied to the corresponding state machine for the identified bank of memory.

Specifically, element 400 tests whether the signal generated by nop detector 508 indicates that the next SDRAM command cycle will be a nop cycle. If so, element 402 determines whether the activation FIFO has any pending activation requests queued. If the activation FIFO is empty, processing continues with element 404 as discussed herein below. If an activation request is queued in the activation FIFO, element 406 is next operable to retrieve the next entry from the activation FIFO and transfer the activation request to the corresponding state machine of the identified bank. Transferring the queued activation request to the state machine for generation of an activate command to replace the next nop cycle in the SDRAM command sequence. Processing then continues with element 408 to await acceptance of the activate command by the state machine and then continues by looping back to element 400 for retrieval and application of a next command. If element 400 determines that the next cycle is not a nop command cycle, element 404 applies the command provided by command decoder to the state machine of the identified bank and then awaits acceptance of the command at element 408 as above.

FIGS. 10–15 depict examples of the sequencing of various SDRAM commands in an exemplary 4 bank system. In FIGS. 10–15, each row indicates an SDRAM command sequence for a corresponding bank (BANK 0 through BANK 3). Each column represents an SDRAM command cycle labeled. 0–n. The last row ("RESULT") indicates the sequence of commands actually generated by the memory controller in accordance with the present invention to replace nop cycles With hidden activations of banks for which reads are forthcoming. In this last row ("RESULTS") each command (other than nop commands)has a suffix indicating the bank number for which the command is applied. In other words, "act0" indicates and activate for bank 0, "pre1" indicates a precharge command for bank 1, etc.

FIG. 10 shows four consecutive hidden activate commands inserted to replace nop commands an overlap one another and to appear in sequence with corresponding precharge commands for the four banks associated with the hidden activate commands. In this simple example, no read or write bursts are depicted. Rather, a sequence of precharge and activate commands are shown to overlap to reduce latency for possible read and write commands to follow.

FIG. 11 shows another sequencing of precharge and activate commands that permit overlap of the activate processing including back-to-back activate command issued to different memory chip devices (i.e., cycles 3–5 show activations of banks 0–2, respectively on sequential cycles).

FIG. 12 is yet another example of sequencing of precharge and activate commands that demonstrates that the rules of queueing and unqueueing activate requests retains the order of operations requested by the originating masters. Specifically, a new activate request can only be issued after all pending activate commands associated with previous precharge commands have been issued. In particular, a hidden activate of bank 1 appears in cycle number 5. Bank 1 is known to be closed at that point and the activate may be inserted replacing a cycle that would otherwise be a nop cycle.

FIG. 13 shows a sequence of precharge and activate commands with two corresponding single cycle read commands. The activate of bank 0 is inserted replaces a nop) at cycle 3 and a precharge of bank 3 inserted at cycle 5, each overlapping with a read burst (single cycle burst) at cycles 2 and 4, respectively.

FIG. 14 depicts a more complex sequence an 8 cycle read burst on bank 1 overlapping with activate and precharge commands for banks 0, 2 and 3. Again, it can be seen that precharge and activate commands for other banks are inserted in place of nop commands for other banks not involved in a present burst command. Replacing nop command cycles normally issued between reads of a burst operation overlaps the latency period of the inserted (hidden) activate and precharge commands with the processing of a present burst operation.

FIG. 15 depicts two 8 cycle read bursts—a first on bank 1 and a second on bank 2. Hidden precharge and activate commands for banks 0 and 3 are inserted to replace nop commands during both burst operations. The second burst starts only after the first completes since two burst operations cannot be simultaneously active.

Those skilled in the art will readily recognize other exemplary sequences of SDRAM commands that may benefit from the present invention. The above example are therefore not intended to limit the invention but are rather provided to suggest by example how the present invention operates to improve system performance by overlapping activate and precharge related latency periods in some memory banks with operations in other memory banks. Further, those skilled in the art will recognize that similar sequences involving write burst operation are addressed by the features of the present invention. The read sequences depicted are merely exemplary of sequences wherein the present invention serves to reduce the impact of required latencies in multibank memory systems.

While the invention has been illustrated and described in the drawings and foregoing description, such illustration and description is to be considered as. exemplary and not restrictive in character, it being understood that only the preferred embodiment and minor variants thereof have been shown and described and that all changes and modifications that come within the spirit of the invention are desired to be protected.

What is claimed is:

1. In a system including multiple banks of synchronous memory coupled to a master device through a memory controller, a method operable in said memory controller for improving memory bandwidth utilization comprising the steps of:

directing a first burst memory access command from said memory controller to a first bank of said multiple banks of memory in response to receipt of a first memory access request from a master device wherein said first burst memory access command requires multiple clock periods to complete;

sensing, within said memory controller, receipt of a next memory access request from a master device during said multiple clock periods wherein said next memory access command requires access to a second bank of said multiple banks of memory; and directing an activate command from said memory controller to said second bank during said multiple clock periods to overlap operation of said activate command with said period of time.

2. The method of claim 1 wherein the step of sensing includes the step of:
queueing an activate request in an activate queue associated with said memory controller, and wherein the step of directing an activate command includes the step of:
unqueueing said activate request from said queue to generate said activate command to be directed to said second bank.

3. The method of claim 2 wherein said queue is a FIFO and wherein the step of queuing includes the step of:

determining whether an activate request corresponding to said second bank is already present in said FIFO; and queueing said activate request in response to a determination that said activate request is not already present in said FIFO.

4. The method of claim 3 wherein said FIFO has a depth equal to the number of banks in said multiple banks of memory.

5. The method of claim 1 wherein the step of directing a first burst memory access command includes the steps of:
applying a read or write command to said first bank on a first clock period of said first bank, and
applying nop commands to said first bank on subsequent clock periods of said multiple clock periods, and wherein the step of directing an activate command comprises the steps of:
determining whether said activate command is permitted during the present clock period of said first bank; and
replacing a nop of said nop commands with said activate command in response to a determination that said activate command is permitted.

6. In a system including multiple banks of synchronous memory coupled to a master device through a memory controller, a method operable in said memory controller for improving memory bandwidth utilization comprising the steps of:

receiving high level commands for burst memory operations from said master device;

operating a state machine for each bank of said multiple banks to generate synchronous memory commands for said each bank in response to high level commands directed to said each bank wherein said synchronous memory commands include read burst commands, write burst commands, nop commands, activate commands and precharge commands; and sequencing said synchronous memory commands for application to said multiple banks to replace nop commands generated for a first bank with precharge and activate commands for a second bank.

7. The method of claim 6 wherein the step of sequencing comprises the steps of:

prioritizing said synchronous memory commands generated for said each bank such that read commands and write commands are applied to corresponding bank in the order received from said master device and such that a read command or a write command for an active row of a bank takes precedence over any other synchronous memory command and such that an activate command or a precharge command for an inactive row takes precedence over a nop command and over a read command or a write command for said inactive row;

selecting a command of said synchronous commands for application to a corresponding bank; and applying said command to said corresponding bank.

8. The method of claim 7 wherein the step of prioritizing includes the step of:
queueing activation requests for banks in which a read command or write command will be applied to a bank upon completion of a present read command or write command, and wherein the step of selecting includes the step of:
unqueueing a queued activation request when said activation request may be applied to a corresponding bank to replace a nop command.

9. A memory controller for controlling multiple banks of SDRAM memory devices, said controller including:

an activation FIFO for queueing activation requests for identified banks of said multiple banks;

a command decoder coupled to said activation FIFO for decoding high level commands received from an associated controlling device and for queueing activation requests derived from said high level commands in said activation FIFO;

a plurality of state machines operable to process the decoded high level command and to generate corresponding sequences of low level command cycles for application to said SDRAM memory device wherein each state machine operates on behalf of a corresponding bank of said multiple banks;

an input selector coupled to said command decoder and to said activation FIFO and to said plurality of state machine to select between a decoded command from said command decoder and an activation request in said activation FIFO for application to the state machine for a bank identified in the selected decoded command or in the selected activation request; and a nop detector for detecting when a next command cycle generated by said plurality of state machines will be a nop command cycle and for generating a signal indicative of such a nop command cycle and for applying said signal to said input selector, whereby said memory controller replaces a nop command cycle with an activate command in accordance with queued activation requests in said activation FIFO.

10. In a system including multiple banks of synchronous memory coupled to a master device through a memory controller, apparatus within in said memory controller for improving memory bandwidth utilization comprising:

means for receiving high level commands for burst memory operations from said master device;

means, coupled to said means for receiving, operable as a state machine for each bank of said multiple banks to generate synchronous memory commands for said each bank in response to high level commands directed to said each bank wherein said synchronous memory commands include read burst commands, write burst commands, nop commands, activate commands and precharge commands; and means, coupled to said means operable as a state machine and to said means for receiving, for sequencing said synchronous memory commands for application to said multiple banks to replace nop commands generated for a first bank with precharge and activate commands for a second bank.

11. The apparatus of claim 10 wherein the means for sequencing comprises:

means for prioritizing said synchronous memory commands generated for said each bank such that read commands and write commands are applied to corresponding bank in the order received from said master device and such that a read command or a write command for an active row of a bank takes precedence over any other synchronous memory command and such that an activate command or a precharge command for an inactive row takes precedence over a nop command and over a read command or a write command for said inactive row;

means for selecting a command of said synchronous commands for application to a corresponding bank; and means for applying said command to said corresponding bank.

12. The apparatus of claim 11 wherein the means for prioritizing includes:
means for queueing activation requests for banks in which a read command or write command will be applied to a bank upon completion of a present read command or write command, and wherein the means for selecting includes:
means for unqueueing a queued activation request when said activation request may be applied to a corresponding bank to replace a nop command.

* * * * *